P. C. JOHNSON.
GEAR SHIFTING LEVER.
APPLICATION FILED OCT. 7, 1913.
1,171,342.
Patented Feb. 8, 1916.
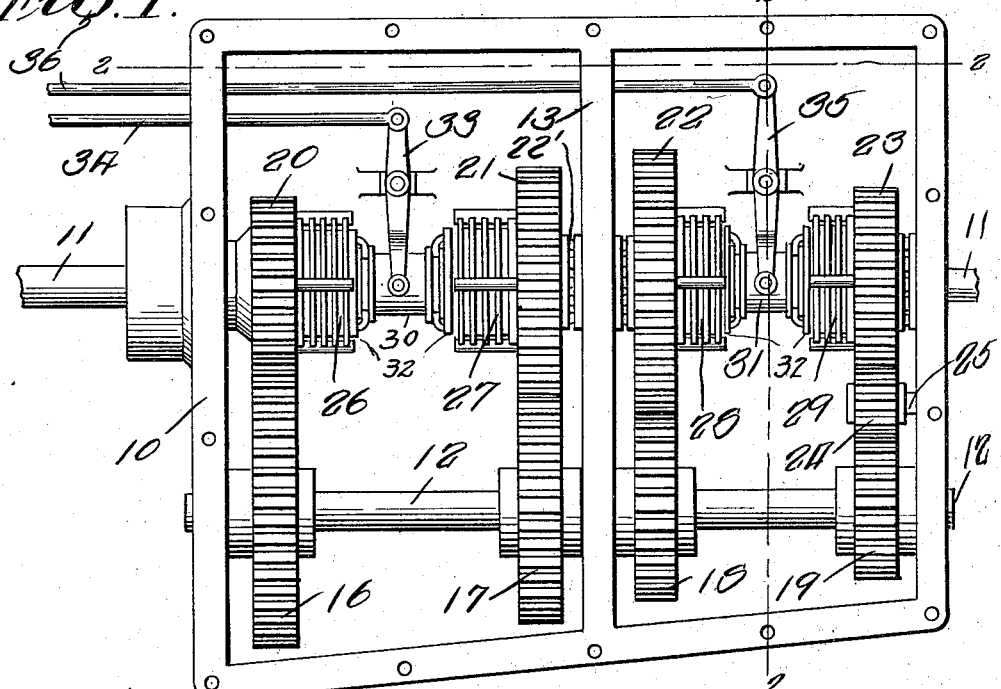
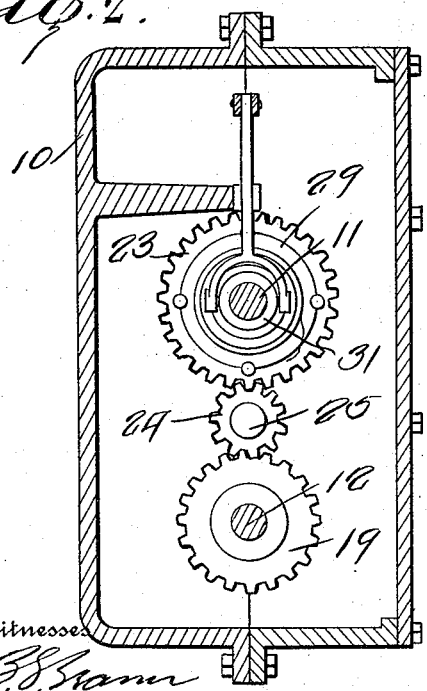
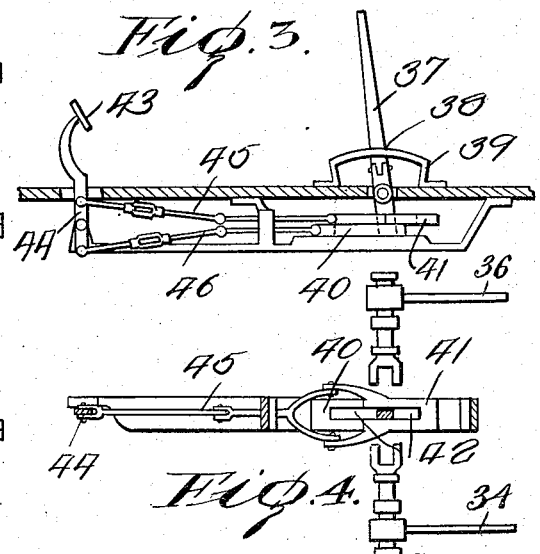
Inventor
P. C. Johnson
Witnesses
Attorneys

UNITED STATES PATENT OFFICE.

PHILIP C. JOHNSON, OF LARUE, OHIO.

GEAR-SHIFTING LEVER.

1,171,342.　　　　Specification of Letters Patent.　　Patented Feb. 8, 1916.

Application filed October 7, 1913. Serial No. 793,905.

*To all whom it may concern:*

Be it known that I, PHILIP C. JOHNSON, a citizen of the United States, residing at Larue, in the county of Marion, State of Ohio, have invented certain new and useful Improvements in Gear-Shifting Levers; and I do hereby declare the following to be a full, clear, and exact description of the invention, such as will enable others skilled in the art to which it appertains to make and use the same.

This invention relates to improvements in transmission gearing, and particularly to transmission gearing for automobiles.

The principal object of the invention is to provide a simple and efficient device of this character by means of which it is possible to attain three speeds forward and one speed reverse.

Another object is to provide a transmission gearing wherein the speed can be quickly, smoothly and noiselessly changed.

Other objects and advantages will be apparent from the following description, when taken in connection with the accompanying drawings.

In the drawings: Figure 1 is a side elevation of the transmission mechanism, one side of the casing being removed; Fig. 2 is a vertical transverse sectional view on the line 2—2 of Fig. 1, looking in the direction of the arrows; Fig. 3 is an enlarged side elevation of the clutch shifting mechanism; and Fig. 4 is an enlarged top plan view thereof.

Referring particularly to the accompanying drawings, 10 represents a casing in which are journaled the parallel longitudinal shafts 11, and 12, this casing being adapted to be filled with oil. One end of the shaft 11 is connected to a differential gearing (not shown). The casing is divided by a vertical wall 13, this wall supporting the middle portion of the shafts 11 and 12, and forming the two compartments 14 and 15. On the shaft 11 are mounted the gears 20, 21, 22 and 23 meshing respectively with the gears 16, 17, 18 and 19, the latter meshing with the gear 23 by means of the intermediate pinion 24 carried on a stub shaft 25 in the end of the casing. Mounted on the shaft 11 and associated with the gears 20 and 21, are the multiple disk clutches 26 and 27. Also on the shaft 11, between the gears 22 and 23 are the disk clutches 28 and 29 operable by the sleeve 31. Carried on each end of each of the sleeves 30 and 31 is a disk 32. These clutches are actuated by the forked levers 33 and 35. The said forked levers are centrally pivoted within the casing, their other ends being pivotally connected respectively with the shifting rods 36 and 34 leading to the operating mechanism which will be described later.

The rods 34 and 36 are arranged to be moved by a vertical controlling lever 37 suitably mounted and arranged to be shifted within the H-shaped slot 38 of the ordinary plate 39. These parts are to be mounted in the usual position on the automobile. Below the slotted plate are two crank members 47 and 48, the former of which is connected to the shifting rod 36 and the latter to the shifting rod 34. On the inner end of each of the crank members is an upwardly and inwardly extending fork 49 into either one of which the lever 37 is adapted to engage when said lever is shifted transversely in the middle slot of the plate. The lever is mounted on a transverse shaft 50 so that it can be moved forwardly and backwardly in parallel slots of the plate. During such movement of the lever one or the other fork members is carried along with the lever causing its crank member to be rocked, pulling the shifting rod and actuating the clutch member to which the other end of the rod is connected. The lever is pivotally connected for lateral movement to a depending portion 51, and springs 52 are mounted at each side of the lever on the lower portion 51 and bearing on the lever above its pivot so as to have a tendency normally to move the lever into the middle of the transverse slot. Below the plate 39 are two plates 40 and 41, each being provided with an open ended slot 42, and the plates being so arranged that the ends of the slots are disposed adjacent each other and in registering relation. These slotted plates receive the lower portion of the lever 37 therein. Mounted within any convenient point within reach of the foot of the operator there is a pedal 43, this pedal being preferably mounted on a centrally pivoted vertical rock arm 44. Connected to the upper end of the lever and to the slotted plate 41 is an adjustable connecting rod 45, while connected to the lower end of the arm 44 and to the slotted plate 40 is an adjustable connecting rod 46. These plates 40 and 41 are adapted to slide over each other, and when the pedal 43 is depressed the plates 40 and 41 are drawn so as to embrace the lower portion of the lever 37, one of the plates sliding on the other. When the pedal is thus operated, the plates 40 and 41 engage the lever and rock the same into the middle or transverse portion of the H-shaped slot which is the neutral position. This is used in an emergency to throw out all of the gearing immediately preceding the application of the brake.

What is claimed is:—

1. The combination with a transmission gearing including gears and clutches, of a pivoted operating lever connected with the clutches, a pair of overlapping and oppositely slidable slotted plates embracing a portion of the lever below the pivot thereof, means for holding the plates in normal position, and a foot pedal connected to the plates and arranged to draw them in opposite directions and into engagement with the lever to move the latter into vertical neutral position.

2. The combination with a clutch shifting lever, the lower portion of which is adapted for movement in one direction and the other portion for movement thereon in a direction at right angles thereto, of a pair of slotted plates embracing the lower portion of the lever, and means for moving the plates slidably over each other to move the lever into an upright position.

In testimony whereof, I affix my signature, in the presence of two witnesses.

PHILIP C. JOHNSON.

Witnesses:
JOSEPH C. CARPENTER,
M. J. HERMAN.

Copies of this patent may be obtained for five cents each, by addressing the "Commissioner of Patents, Washington, D. C."